United States Patent [19]

Matsui et al.

[11] Patent Number: 4,625,904
[45] Date of Patent: Dec. 2, 1986

[54] STRUCTURE OF DISC WHEEL

[75] Inventors: Hitoshi Matsui; Fumiaki Kawahata, both of Toyota, Japan

[73] Assignee: Toyota Jidosha Kabushiki Kaisha, Aichi, Japan

[21] Appl. No.: 802,087

[22] Filed: Nov. 27, 1985

Related U.S. Application Data

[63] Continuation of Ser. No. 541,251, Oct. 12, 1983, abandoned.

[51] Int. Cl.⁴ ............................................. B23K 31/02
[52] U.S. Cl. .................................. 228/168; 228/182; 228/167; 228/166
[58] Field of Search ................ 228/182, 166, 167, 168

[56] References Cited

FOREIGN PATENT DOCUMENTS 0019455 6/1978 Japan ................................... 228/166
0759272 7/1980 U.S.S.R. ............................. 228/168

Primary Examiner—Nicholas P. Godici
Assistant Examiner—Karen Skillman
Attorney, Agent, or Firm—Parkhurst & Oliff

[57] ABSTRACT

A welding structure for a disc wheel installed on a vehicle. The disc wheel comprises a rim and a disc, the disc having an outer peripheral portion fixed to an inner surface of the rim by welding. The edge surface of the outer peripheral portion of the disc is inclined with respect to the rim, and when assembled contains the end portion of the weld.

1 Claim, 18 Drawing Figures

Fig. 3
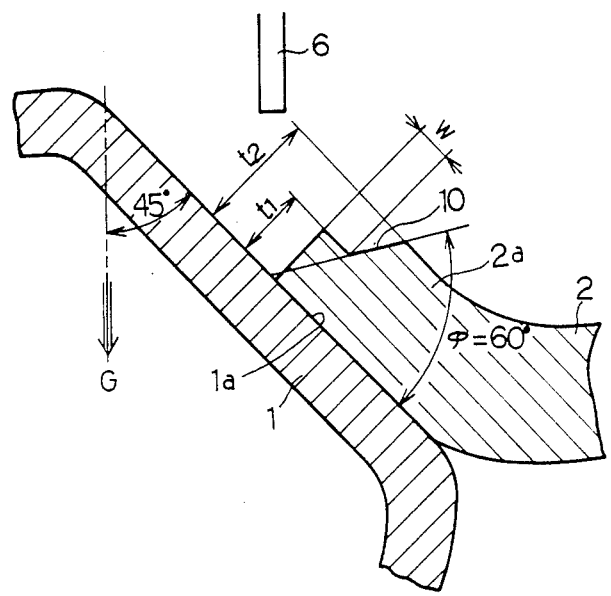
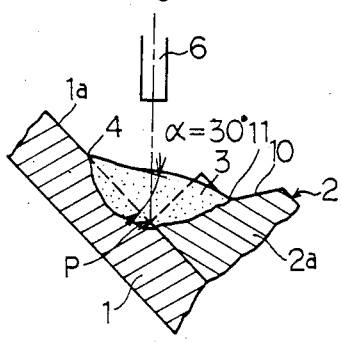
Fig. 4a
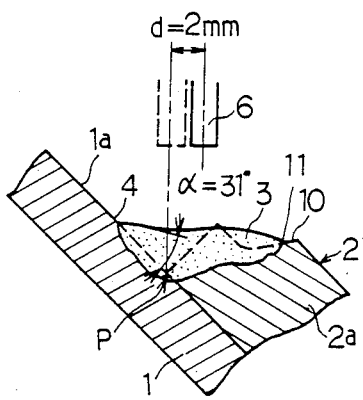
Fig. 4b
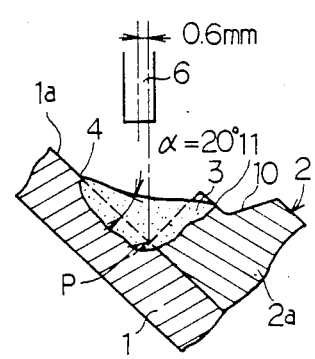
Fig. 4c

STRUCTURE OF DISC WHEEL

This is a continuation of application Ser. No. 541,251 filed Oct. 12, 1983, now abandoned.

BACKGROUND OF THE INVENTION

The present invention relates to a structure of a disc wheel, installed on a vehicle, onto which tires are mounted, and more particularly to a structure of a disc wheel which improves the weld which joins a rim and a disc together.

Prior art discloses a rim and a disc of a disc wheel which are joined together by welding. The conventional disc wheel structure is disclosed in FIGS. 7, 8, 9(a), 9(b), 10(a), 10(b) and 10(c). FIG. 7 shows a cross-sectional view of a previously known disc wheel, while FIGS. 8, 9(a), 9(b), 10(a), 10(b) and 10(c) show enlarged views of the welded portion which joins the rim and disc together. FIGS. 7, 8, 9(a), 9(b), 10(a), 10(b) and 10(c) show a disc 2 made of casting or wrought products (including a material for forging) fitted to an inner surface 1a of a rim 1. The disc 2 comprises a main portion 2b extending radially outward and an angled, portion 2a which is in contact with and parallel to a portion 1a of a rim 1. Generally, arc welding is performed at a position between the surface 1a of rim 1 and the tip of the portion 2a of the disc 2, thereby forming a fillet weld thereon.

It is well known that a concentration of stress may occur in the rim 1 around the tip end 4 of the weld metal 3 when the angle $\alpha$, which is defined as the angle between the inner surface 1a of the rim 1 and the upper surface of weld metal 3, exceeds valves of 40°. When $\alpha$ approaches or surpasses this 40° valve, a crack "A", as shown in FIG. 8, may occur at a position where the tip of the weld metal 3 contacts the inner surface 1a of the rim 1. Therefore, to prevent such cracks from forming in the rim, it is necessary to maintain the angle $\alpha$ at a value less than 40°. Even if an electrode wire 6 is oriented to maintain the angle $\alpha$ at an amount less than or equal to 40°, if an operator makes a mistake on the positioning of the wire 6, the resulting angle $\alpha$ may exceed the 40° desired limit. If the wire 6 moves from its desired position, shown in FIG. 9(a), to the position indicated by the dotted line, shown in FIG. 9(b), the weld metal 3 envelopes the inner shoulder of portion 2a of the disc 2, and assumes a convex shape. As a result, the angle $\alpha$ may exceed the value of 40°, thereby resulting in stress concentration at the point 4.

A previous attempt to solve the problem of an erroneously placed electrode wire 6 was to decrease the amount of weld metal 3 used to join the rim to the disc. However, by reducing the amount of weld metal 3 used, as shown in FIG. 10(a), the thickness of the weld metal 3 correspondingly decreased at the tip end 4. Therefore, the strength of the joining weld subsequently decreases, and the risk of a crack occurring in the weld metal 3, as shown in FIG. 10(b), subsequently increases. Also, when the wire 6 is moved from its correct application position, the result may be the formation of an undercut C in the rim 1 and poor welding D at the top surface 2a of the disc 2, as shown in FIG. 10(c), thereby reducing the strength of the overall assembly. Therefore, it is not preferable to form an angle $\alpha$ which is less than or equal to 20°.

Consequently, in order to prevent cracks from forming in the rim 1 or the weld metal 3, it is preferable to maintain the angle $\alpha$ somewhere in the range between 20° and 40°. However, it is difficult to keep the electrode wire 6 in its correct application position, which subsequently results in the production of inferior disc wheel assemblies.

SUMMARY OF THE INVENTION

The present invention was made in view of the foregoing background and to overcome the foregoing drawbacks. It is accordingly an object of this invention to provide a welding structure for a disc wheel employed in a vehicle, wherein the valve of the angle $\alpha$, formed between an inner surface of a rim and an upper surface of the weld metal, is maintained within a predetermined range, even if the weld applying electrode is improperly positioned.

To obtain the above objects, a welding structure for use in a disc wheel according to the present invention, comprises:

an annular rim having an inner surface;
a disc, having
    a main portion extending radially outward and
    an angled portion peripherally located on the outermost radial portion of the main portion, and contacted with and parallel to the inner surface of the rim, the angled portion including an edge surface, inwardly inclined with regard to the inner surface of the rim, whereby welding occurs on the area between the inclined top edge of the angled portion and the inner surface of the rim, resulting in the disc being firmly fixed to the rim.

BRIEF DESCRIPTION OF THE DRAWINGS

The above objects, features and advantages of the present invention will become more apparent from reading the following description of the preferred embodiments taken in connection with the accompanying drawings, wherein:

FIG. 3 is an enlarged cross-sectional view illustrating an embodiment of the present invention;

FIGS. 4(a), (b) and (c) are cross-sectional views of the embodiments of the present invention according to the changes in the positioning of the electrode wire;

DETAILED DESCRIPTION OF THE PREFERRED EMBODIMENTS

The present invention is described in detail with reference to the accompanying drawings which illustrate different embodiments of the present invention.

Figure 1:
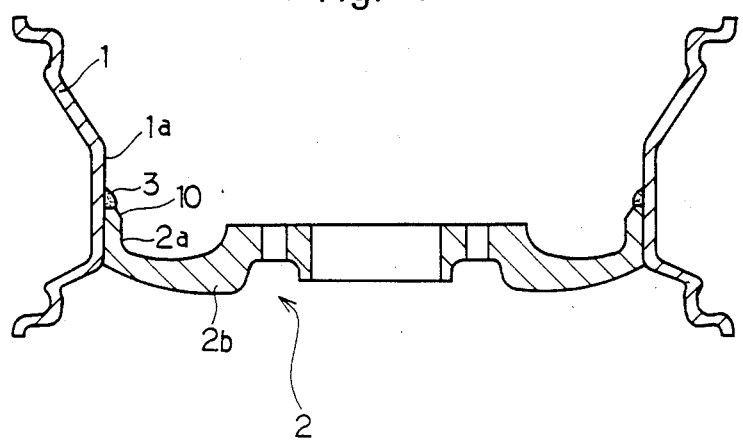
FIG. 1 is a cross-sectional view of a disc wheel according to the present invention.
Figure 2:
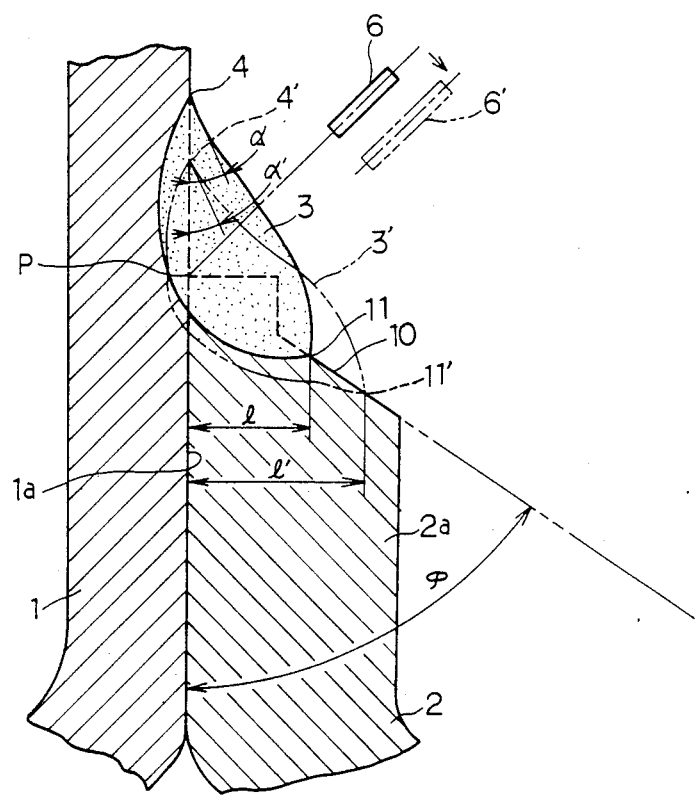
FIG. 2 is an enlarged cross-sectional view illustrating the welding structure according to the present invention.

Referring first to FIG. 1, there is illustrated a cross-sectional view of disc wheel according to the present invention. The disc wheel comprises a rim 1 and a disc 2, which is secured to the rim 1 by welding. The rim 1 has an annular inner surface 1a. The disc 2 has a main portion 2b extending radially outward, and an angled portion 2a peripherally located on the outermost radial portion of the main portion 2b. The innermost part of the top edge of the portion 2a is slanted, thereby forming an inclined portion 10. Welding, such as arc welding, is performed between the top edge of the portion 2a and the inner surface 1a of the rim 1, thereby fixing the disc 2 to the rim 1. FIG. 2 shows an enlarged cross-sectional view of the welding structure. The disc 2 has an edge surface 10 which is inclined with respect to the inner surface of the rim 1. The inclined portion 10 defines an angle $\phi$ created between the inner surface 1a of the rim 1 and the inclined portion 10, the angle $\phi$ having a value somewhere in the range of 30° to 80°. Arc welding is performed on the position between the inner surface 1a of the rim 1 and the top edge of the angled portion 2a. The weld metal 3 is applied so that it is contacted with the position 11 of the inclined portion 10 and a position 4 on the rim 1. The reference letter P designates the intersecting point between the inner surface 1a of the rim 1 and the top edge of the angled portion 2a. An electrode wire 6, as represented by the solid line in FIG. 2, is positioned to point directly at the intersection point P. The radial thickness of weld metal 3, from the inner surface 1a of rim 1 to the disc 2, is indicated by the reference letter l. The angle $\alpha$ is defined as the angle between the inner surface 1a of the rim 1 and the upper surface of the weld metal 3.

When the electrode wire 6 shifts from its solid line position to its dotted line position, indicated by 6', corresponding changes occur in the weld, all of which are shown in FIG. 2 and referenced by similar numerals followed by an apostrophe. The following changes occur when the electrode wire shifts as indicated: the weld metal 3 shifts from the solid line position 3 to the chain line position 3', the outermost contact point of the weld metal 3 to the rim 1, shifts from the position 4 to the position 4', the innermost contact point of the weld metal 3 to the disc 2 shifts from the position 11 to the position 11' along the inclined portion 10, and the radial thickness of the weld metal 3 is lengthened from l to l'. Therefore, the weld metal 3 has shifted radially inward along the inclined portion 10 to its 3' position without forming a convex shape at its surface as shown in the prior art, FIG. 9(b). Further, the angle $\alpha'$ defined between the inner surface 1a of the rim 1 and the upper surface of the weld metal 3' does not change so much as the angle $\alpha$ shown in FIG. 9(b) changes.

Figure 9A:
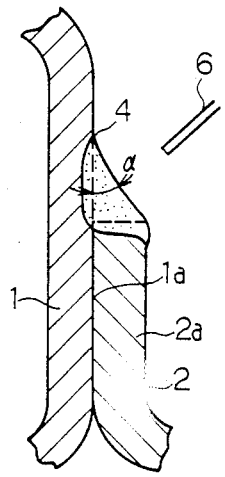
FIGS. 9(a) and (b) are cross-sectional views illustrating the resulting prior art welding structure according to changes in the positioning of the electrode wire.
Figure 9B:
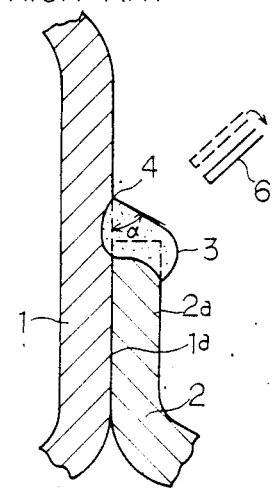

Hence, so long as the innermost contact point 11, of the weld metal 3 to the disc 2, occurs on the inclined portion 10 of the disc 2, the angle $\alpha$ will not change as much as it would when utilizing the prior art design shown in FIG. 9(b). This results in the angle $\alpha$ ($\alpha'$) being maintained within the 20° to 40° range regardless of a small change in the positioning of the electrode 6.

Referring next to FIGS. 3, 4(a), 4(b) and 4(c), another embodiment of the present invention is illustrated. In FIG. 3, the sizes of members are as follows.

$\phi = 60°$ (the angle defined between the inner surface 1a of rim 1 and the inclined portion 10)

$t_1 = 6$ mm (the thickness of the non-inclined portion of the upper portion 2a)

$t_2 = 10$ mm (the entire thickness of the angled portion 2a of disc 2)

$W = 3$ mm (the width of portion $t_1$)

The area of contact between the rim 1 and the disc 2 is inclined at an angle of 45°, with respect to the force of gravity, when the welding operation is performed. In this layout, shown in FIG. 4(a), the electrode wire 6 is directed to the intersection point P between the inner surface 1a and the top edge of the angled portion 2a. When the welding operation is completed, the resulting angle $\alpha$ is 30°.

FIG. 4(b) shows the welding operation occurring with the electrode wire 6 shifted a 2 mm horizontal distance to the right of the dotted line position, which corresponds to the FIG. 4(a) positioning. This results in the innermost contact point of the weld metal 3 to the disc 2 shifting toward the inner part of the disc 2 along the incline 10, resulting in the angle $\alpha$ equaling 31°. It is therefore apparent that the difference between the angle $\alpha$ in FIG. 4(a) and the angle $\alpha$ in FIG. 4(b) is 1°.

In FIG. 4(c) the electrode wire 6 is shifted toward the rim a distance of only 0.6 mm from its original position shown in FIG. 4(a), all other conditions are equivalent to those previously discussed. The innermost contact point 11 shifts away from the inclined portion 10, resulting in the angle $\alpha$ decreasing to 20°. Therefore, these results indicate that in order to keep the deviation in the angle $\alpha$ small, it is necessary to maintain the innermost contact point 11 of the weld metal 3 to the disc 2, somewhere upon the inclined portion 10 of the disc 2.

Figure 5:
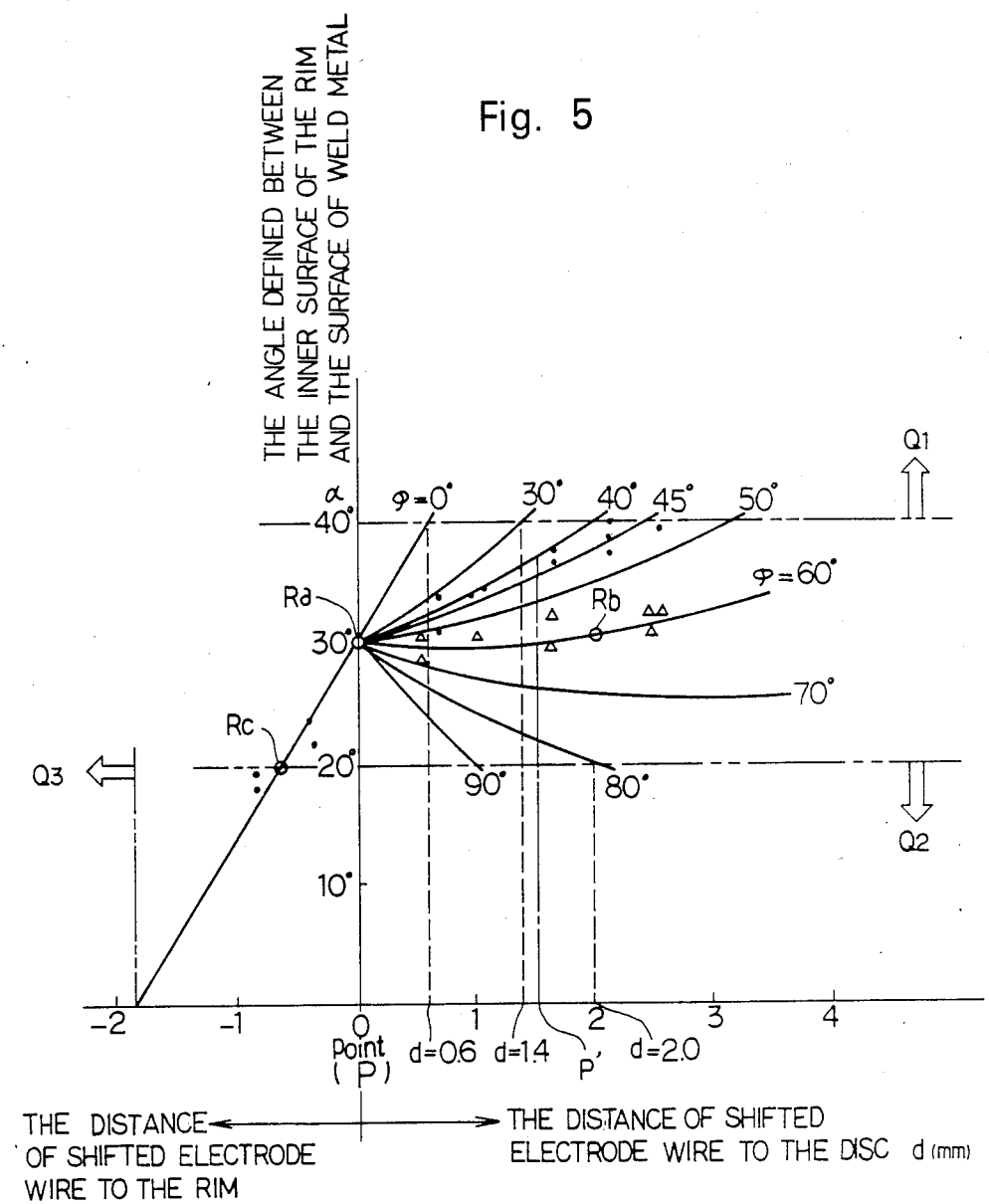
FIG. 5 is a diagram showing the relation of the position of the electrode wire to the angle defined between the inner surface of the rim and the upper surface of the weld metal.

FIG. 5 illustrates the relationship between the angle $\phi$, the angle $\theta$ and the horizontal displacement of the electrode from the point P utilizing the set up in FIG. 4. The solid lines correspond to simulation results for different values of the angle $\phi$ calculated using theoretical values for the surface tension of the weld metal and gravity effects The references (·) appears around the solid line corresponding to $\phi = 45°$ and the reference ($\Delta$) appears around the solid line corresponding to $\phi = 60°$ and represent actual experimental values. The experimental values are in substantial accordance with the theoretically plotted solid lines.

Figure 8:
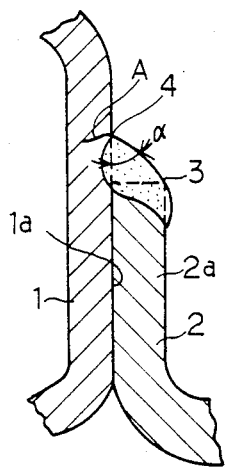
FIG. 8 is an enlarged cross-sectional view of FIG. 7.
Figure 10A:
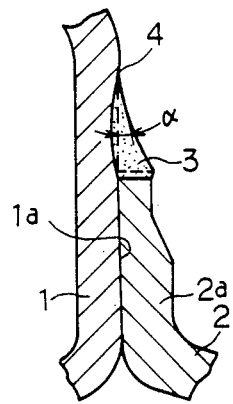
FIGS. 10(a), (b) and (c) are cross-sectional views illustrating the resulting prior art welding structures when a reduced amount of welding metal is used.
Figure 10B:
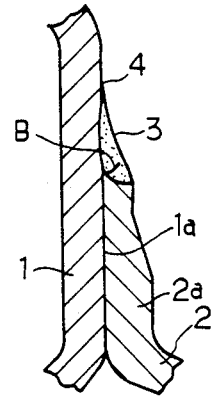
Figure 10C:
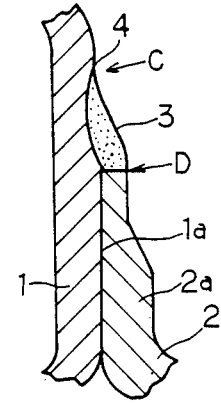

The zone Q1 in FIG. 5, corresponds to values of $\alpha$ in excess of 40° and therefore designates the region where cracks might occur around the edge of the weld metal 3 to the rim 1, during the endurance test (See FIG. 8). The zone Q2 in FIG. 5, corresponds to values of $\alpha$ which are less than 20°, and therefore designates the region where cracks due to a reduced thickness of the weld metal might occur within the weld metal 3 during the endurance test (See FIG. 10(b)). The zone Q3 in FIG. 5, corresponds to an electrode wire displacement in excess of 2 mm toward the rim, and therefore designates the region where an undercut might occur at a position between the weld metal and the rim, or poor welding might occur between the weld metal and the top surface 2a of the disc 2, as shown in FIG. 10(c). In FIG. 5, the references Ra, Rb and Rc, correspond to the actual experimental conditions disclosed in FIGS. 4a, 4b and 4c, respectively.

FIG. 5 shows that when the angle $\phi$ equals 60°, the amount of the change in the angle $\alpha$, resulting from a change in the position of the electrode wire, is very minimal. Therefore, when $\phi$ equals 60°, improper positioning of the electrode wire 6 does not result in reaching a critical value of the angle $\alpha$. However, when the angle $\phi$ equals 0°, corresponding to the prior art condition, electrode wire positioning becomes very critical, because the slope of the $\phi$ equals 0° line is so steep, a small change in the position of the electrode wire results in a correspondingly large change in the value of $\alpha$. For example, if the electrode wire 6 is more than 0.6 mm from the point P in the direction of the disc 2, the resulting value of $\alpha$ will be greater than 40°, thereby increasing the risk of cracks in the rim 1. When $\phi$ equals 30°, the electrode 6 may be displaced up to approximately 1.4 mm before $\alpha$ reaches the critical value of 40°. Further, when $\phi$ equals 80°, the electrode 6 may be displaced up to approximately 2.0 mm before $\alpha$ reaches the critical value of 40°.

The above discussion makes it apparent that the permissible distance d that the electrode 6 can be displaced without resulting in an angle $\alpha$ in excess of 40°, is significantly increased by including an inclined plane 10 on the top of the angled portion 2a of the disc 2. Therefore, by following the welding procedure discussed herein, it is much easier to obtain the desired welding profile because the probability of an operator making a stress concentrated weld has been significantly reduced.

Figure 6A:
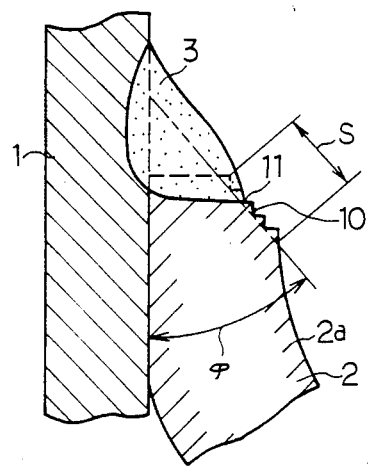
FIGS. 6(a), (b), (c) and (d) are cross-sectional views of other embodiments according to the present invention.
Figure 6B:
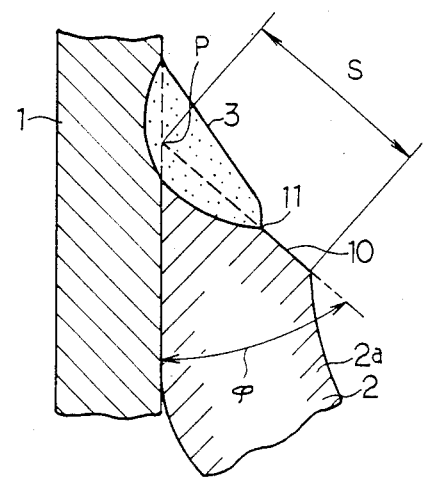
Figure 6C:
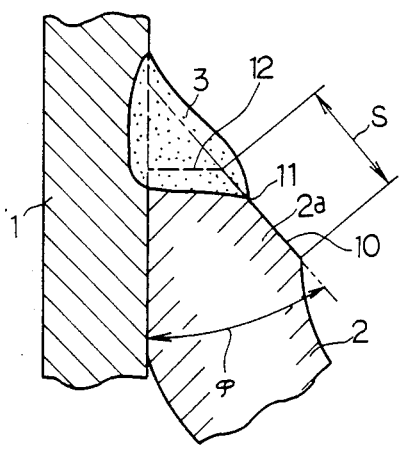
Figure 6D:
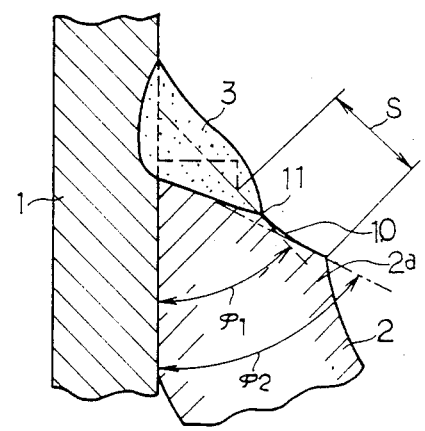
Figure 7:
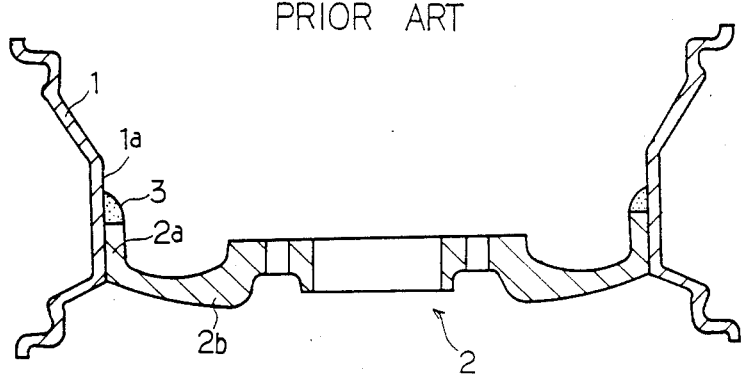
FIG. 7 is a cross-sectional view of a disc wheel according to prior art.

Different embodiments of the welded joint according to the present invention are shown in FIGS. 6(a) through 6(d). FIG. 6(a) illustrates the inclined portion 10, comprised of a plurality of steps. FIG. 6(b) shows the inclined portion 10 extending all the way to the intersecting point P. Further, FIG. 6(c) illustrates the edge surface comprising a curved portion 10 and a plane 12 connected with the inclined portion 10 at one end and with the inner surface of the rim 1 at the other end. Lastly, FIG. 6(d) shows the embodiment whose inclined portion 10 comprises different curves connected in seriatim. The curves define angles $\phi_1$ and $\phi_2$ between the inner surface 1a of rim 1 and the curves, respectively. The reference S, in FIGS. 6(a) through 6(d), designates the acceptable area for the weld metal 3 to terminate.

As apparent from the above description, according to the present invention, the deviation in the angle $\alpha$ can be maintained to be a small value so long as the weld metal 3 terminates somewhere on the inclined portion 10 of the disc 2.

While the present invention has been described in its preferred embodiments, it is to be understood that the invention is not limited thereto, and may be otherwise embodied within the scope of the following claims.

What is claimed is:

1. A method for forming a disc wheel, comprising the steps of:

locating an inner surface of an annular rim against an outer surface of an angled portion of a disc, an edge surface of said angled portion being provided with a generally flat surface perpendicular to the inner surface of the rim for forming a corner therebetween, and an inclined surface located between the generally flat surface and an inner face of the angled portion, the inclined surface being inclined radially inward away from said rim;

focusing a welding electrode at the corner between the inner surface of the rim and the generally flat surface of the angled portion; and securing the rim to the disc by welding in the area between the edge surface of the angled portion and the inner surface of the rim, the step of securing including locating a radially innermost contact point of the welding on the inclined surface of the edge surface.

* * * * *